US008411837B2

(12) United States Patent
Baumeister et al.

(10) Patent No.: US 8,411,837 B2
(45) Date of Patent: *Apr. 2, 2013

(54) ENHANCED DIRECTORY ASSISTANCE SYSTEM WITH VOICE OVER IP CALL HANDLING

(75) Inventors: Christine Baumeister, Schwenksville, PA (US); Natalia Kulik, Bethlehem, PA (US)

(73) Assignee: Grape Technology Group, Inc., Bethlehem, PA (US)

( * ) Notice: Subject to any disclaimer, the term of this patent is extended or adjusted under 35 U.S.C. 154(b) by 153 days.

This patent is subject to a terminal disclaimer.

(21) Appl. No.: 12/979,352

(22) Filed: Dec. 28, 2010

(65) Prior Publication Data

US 2012/0008531 A1    Jan. 12, 2012

Related U.S. Application Data

(63) Continuation of application No. 12/077,187, filed on Mar. 17, 2008, now Pat. No. 7,912,202, which is a continuation of application No. 11/027,568, filed on Dec. 30, 2004, now Pat. No. 7,400,717.

(51) Int. Cl.
*H04M 3/42* (2006.01)
*H04L 12/66* (2006.01)

(52) U.S. Cl. ............... 379/218.01; 370/352; 455/414.1

(58) Field of Classification Search ............. 379/218, 379/258, 218.01; 370/352, 328, 356; 455/414.1, 455/445; 709/230
See application file for complete search history.

(56) References Cited

U.S. PATENT DOCUMENTS 6,714,641 B2 *  3/2004  Kredo et al. ................ 379/258
6,970,548 B2 * 11/2005  Pines et al. ............... 379/218.01

* cited by examiner

*Primary Examiner* — Thjuan K Addy
(74) *Attorney, Agent, or Firm* — Sofer & Haroun, LLP

(57) ABSTRACT

A method is provided for operating a directory assistance system is provided that includes the arrangement for storing a plurality of directory listings including listings relating to identification of Voice over IP devices. The directory assistance system is configured to receive a directory request for one of said directory listings from a variety of callers employing landline. The directory assistance system retrieves the requested information and generates a call completion record for providing information responsive to said directory request. The call completion record includes information relating to a Voice over IP device in a case wherein the requested information relates to a Voice over IP device. The call completion record includes information relating to a mobile phone device in a case wherein the requested information relates to a mobile phone device. The call completion record includes information relating to a landline device in a case wherein the requested information relates to a landline device.

14 Claims, 6 Drawing Sheets

INCOMING CALL INFORMATION RECORD 15

| NUMBER DIALED BY REQUESTER 100 | PREFERRED LANGUAGE CODE FIELD 102 | ORIGINATING PHONE NUMBER OF REQUESTER 104 | REQUESTER SERVICE PROVIDER FIELD 106 | FEATURE CODE 108 |
|---|---|---|---|---|

| UCI FIELD 110 |
|---|

FIG. 2

CALL COMPLETION DATA PACKET 50

54 • ORIGINATING PHONE NUMBER OF REQUESTER FIELD
56 • RD INFORMATION FIELD
58 • CLOSING PROMPT CODE FIELD
59 • PRE-ANNOUNCEMENT FIELD
60 • UCI FIELD

FIG. 3

ENHANCED DIRECTORY ASSISTANCE SYSTEM WITH VOICE OVER IP CALL HANDLING

RELATED APPLICATION

This application is a continuation application of U.S. patent application Ser. No. 12/077,187 filed on Mar. 17, 2008 now U.S. Pat. No. 7,912,202 which is a continuation of 11/027,568, now U.S. Pat. No. 7,400,717 originally filed on Dec. 30, 2004, the entirety of which are incorporated by reference.

FIELD OF THE INVENTION

The present invention is directed to a system and method for delivery of enhanced directory assistance. More particularly, the present invention relates to a system and method for delivery of enhanced directory, assistance, for phone calls employing Voice Over IP (VoIP) technology.

DESCRIPTION OF THE RELATED ART

The use of Voice over IP (VoIP) telephony has been increasing at a staggering pace within the last few years. The early issues relating to the voice quality of Internet phones, the service quality, scalability, migration, features and functionality have been dealt with to a great degree, allowing large scale use within enterprise environments.

Many organizations are now employing a new breed of server systems also referred to as IP PBXes that run digitized voice and call control over the packet-based IP data network. These servers provide most or all of the features of their predecessor PBX systems and connect over LAN or WAN with IP-enabled phone handsets. The IP handsets look and function exactly like the regular phone sets. However, a recent trend has led to configure such IP handsets to include more PC-like features, such as color displays, Web surfing, and access to data applications. Other types of IP phones include IP softphones, which provide the same handset capabilities in software installed on a PC, a notebook, or a PDA.

As the number of such IP phone users is increasing in such a rapid pace, there is a need for an Enhanced Directory Assistance System that is capable of handling directory assistance inquiries relating to IP phone services.

SUMMARY OF THE INVENTION

In accordance with various aspects of the invention, a method for operating a directory assistance system is provided that includes the arrangement for storing a plurality of directory listings including listings relating to identification of Voice over IP devices. The directory assistance system is configured to receive a directory request for one of said directory listings from a variety of callers employing landline. The directory assistance system retrieves the requested information and generates a call completion record for providing information responsive to said directory request. The call completion record includes information relating to a Voice over IP device in a case wherein the requested information relates to a Voice over IP device. The call completion record includes information relating to a mobile phone device in a case wherein the requested information relates to a mobile phone device. The call completion record includes information relating to a landline device in a case wherein the requested information relates to a landline device.

BRIEF DESCRIPTION OF THE DRAWINGS

For the purpose of illustrating the invention, there are shown in the drawings several forms, which are presently preferred, it being understood, however, that the invention is not limited to the precise arrangements and instrumentalities shown.

FIG. 2 is block diagram of an incoming call record in accordance with one embodiment of the present invention:

FIG. 3 is a block diagram of a call completion data packet, in accordance with one embodiment of the present invention.

DETAILED DESCRIPTION

Figure 1:
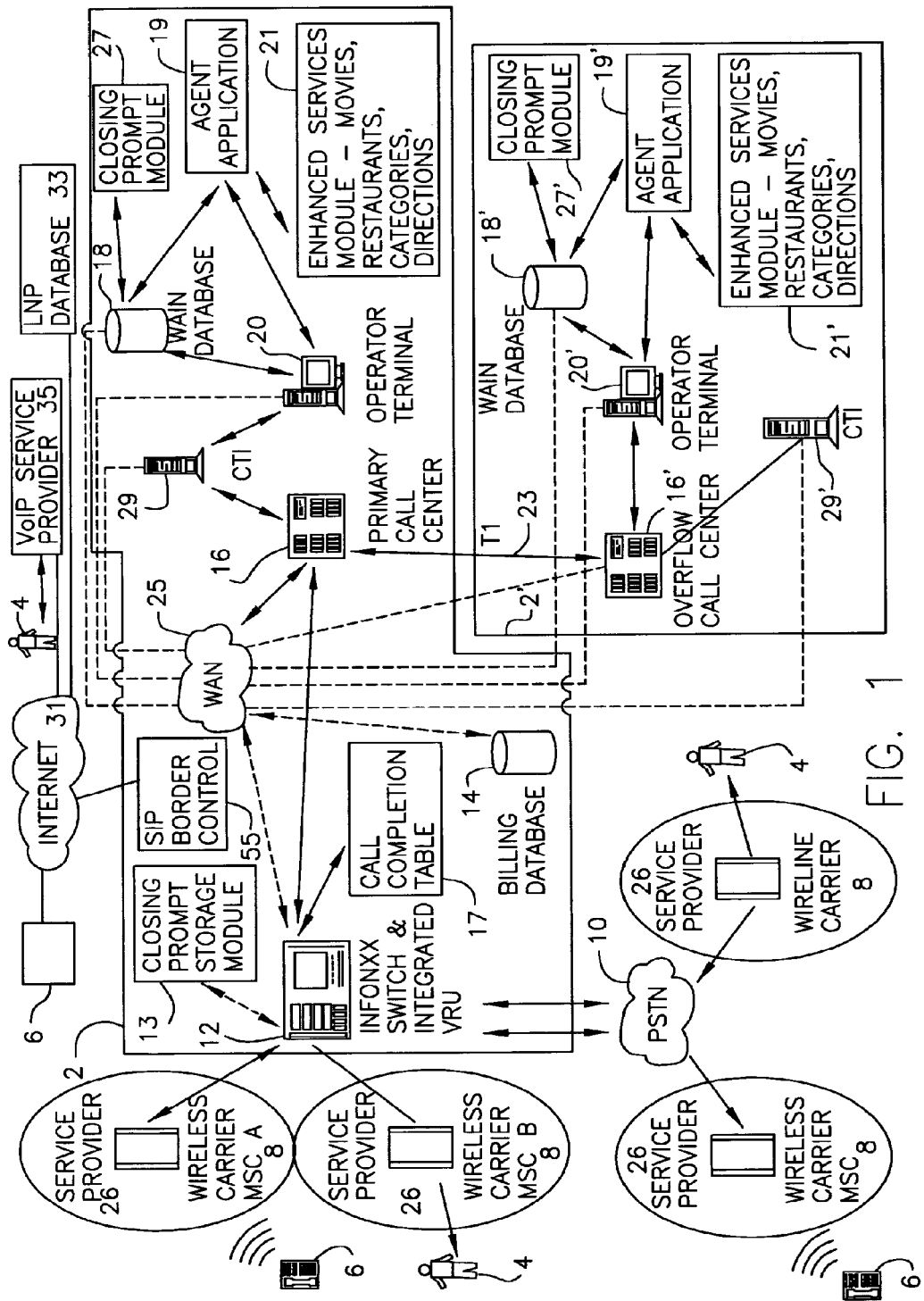
FIG. 1 is a diagram of a communication assistance system of the present invention in accordance with one embodiment of the present invention.

Referring now to the drawings, wherein like reference numerals refer to like elements, there is shown in FIG. 1, a directory assistance system and network 2 in accordance with one embodiment of the present invention. System 2 allows a requester 4 to initiate a communication with system 2 to make a directory assistance request. The request can include but is not limited to obtaining a desired telephone number, connecting a call to that same number, requesting directions or, requesting a particular service such as movie ticket purchase, placing reservations etc. . . .

Although many options for requests exist, typical requester 4 contacts system 2 in order to request either a desired telephone number or additionally, request that they be automatically connected to that requested number. The desired connection that requester 4 is requesting is referred to throughout the application as requested device 6. As noted above, requested device 6 is typically a landline telephone a cellular phone or a VoIP phone, however, requested device 6 is not limited in that respect. System 2 stores information relating to requested device 6, such as the name of person or organization the device is registered with and other identification information relating to a listing.

Requested device 6 is any known communication device including cellular telephones and modems, pagers, PCS phones and modems, RIM Blackberry, wireless PDA, instant messaging devices, SMS devices, VoIP devices and the like.

Although the request of requester 4 may be for many types of services, for the purposes of illustration, requester 4 is referred to throughout as requesting to be connected to a requested device 6, such as a telephone, unless otherwise specified.

Directory assistance system 2 is preferably coupled to one or more service providers 26 directly through a wireless MSC (Mobile Switching Center) 8 or via public switched telephone network (PSTN) 10. In accordance with one embodiment of the invention, directory assistance system 2 is also coupled to one or more VoIP service providers 35 via the Internet 31.

In general, requester 4 and requested devices 6 communicate with system 2 via mobile switching center (MSCs) 8, PSTN 10 and Internet 31 as shown in FIG. 1. As shown in FIG. 1, system 2 preferably comprises one or more switches 12. Each switch 12 may include integrated voice response units as well. The VRU may be standalone instead of integrated as described above.

System 2 also includes billing databases 14, primary call centers 16, requested number databases 18 (which may include wireless apparatus identification number (WAIN) databases), a plurality of operator terminals 20 running agent application 19, enhanced service modules 21 that may be operated by an agent, closing prompt storage module 13, call completion table 17, a wide area network 25, closing prompt modules 27 coupled to agent applications 19, and a computer telephony interfaces 29. In particular, billing database 14 is connected to WAN 25 and can be coupled to any component of system 2. Switches 12 are coupled to Mobile Switching Centers (MSCs) 8 and PSTN 10 as well as primary call center 16. Primary call center 16 is also coupled to at least one operator terminal 20 and database 18.

In a preferred embodiment of the present invention a plurality of directory assistance systems 2 and system 2', illustrated in FIG. 1, can be strategically located in various geographic locations across the country. For example, system 2 or system 2' (call center) can be located in a major metropolitan area spread across the United States or anywhere in the world. Each system 2 is configured to handle the call traffic that is designated for that call center which could include all possible type of calls.

Additionally, as reflected in FIG. 1, each system 2 can be connected to other systems 2'. It is understood that any number of additional directory assistance systems 2 or 2' may be interconnected with one another. This connection can be achieved by the coupling of primary call centers 16 of the various systems 2 via high capacity telephone cables such as T1 lines 23, via WAN 25 or other comparable facilities including PSTN 10. It is also in the contemplation of this invention that these connections could be established through the use of a virtual private network (VPN) or other comparable technology.

The links coupling the network components of system 2 together and with service providers 26 via mobile switching center (MSC) 8 and Public Switched Telephone Network (PSTN) 10, and VoIP service provider 35 can be any known voice and/or data communication technologies, including wide area networking and local area networking communication technologies, for example, digital subscriber lines (DSL), digital T-1s, leased lines, satellite or wireless links, Integrated Services Digital Network (ISDN) circuits, asynchronous transfer mode (ATM), Ethernet, token ring, fiber distributed-data interface (FDDI) and the like.

It is also presumed that the various components of system 2, service providers 26 and 35 and PSTN 10 are arranged with appropriate communication hardware interfaces to transmit and receive data across the communication links. For example, wireless service providers 26 may interface directly with system 2 via mobile switching center (MSC) 8 hardware, coupled directly to switch 12 of system 2. Similarly, VoIP service providers 35 may interface with system 2 via their own Session Border Controllers (SBCs) and the Internet.

In one example of network element within system 2, switches 12 are provided, which preferably include an integrated voice response unit (VRU). Many functions performed by switches 12 are known to those of ordinary skill in the art and include telephone call routing between trunks, converting one signaling type to another, such as between a digital signaling system, dual-tone multi-frequency (DTMF) signaling, multi-frequency (MF) signaling, ISDN, SS7, and capturing call length and destination data for billing, etc.

However, in accordance with one embodiment of the present invention, switches 12 are also configured to handle call set ups for VoIP calls by incorporating various IP calling standards, such as Session Initiation Protocol (SIP) and H.323 signaling. To this end, switch 12 communicates with WAN 25 to set up calls via Internet 31.

Furthermore, in order to accommodate directory assistance inquiries from a requester 4 who employs a VoIP phone, system 2 is configured to handle VoIP protocols such as Session Initiation Protocol SIP throughout its pertinent network elements.

Information relating to each VoIP-enabled phone, subscribed with system 2, is stored in database 18. Within this context, subscription refers to listing a phone number with directory assistance system 2. Such listing may be provided by each service provider such as 26 and 35, or through direct registration by each user who desires to have their phone information listed with directory assistance system 2.

In accordance with one embodiment of the invention each VoIP device includes a unique hardware identification code referred to as Media Access Control (MAC) address. Information relating to this MAC address may be stored in a variety of formats so as to enable directory assistance system 2 to access a VoIP phone with its corresponding unique MAC address.

To this end, in accordance with one embodiment of the invention, system 2 may store the unique MAC address in database 18 corresponding to each subscriber. However this approach may compromise security and privacy concerns.

As such, in accordance with another embodiment of the invention, VoIP service provider 35 is configured to provide a unique IP address corresponding to the MAC address of each phone coupled to it. For this approach, database 18 of system 2 may store the unique IP address of each subscriber's IP phone.

Yet in accordance with another embodiment of the invention, VoIP service provider 35 is advantageously configured to issue an email address corresponding to each Media Access Control (MAC) address. For this approach database 18 may store the unique MAC corresponding email address for each subscriber that employs an IP phone.

In accordance with other arrangements for using VoIP phones, some users employ portable VoIP phones that can communicate in any location that provides access to Internet, such as locations referred to as hot spots. In such locations, a wireless router is configured to transmit and receive data packets with wireless devices that fall within its reception zone.

For such portable VoIP phones, each service provider 35 is configured to assign a telephone number that has the same format as land-line or wireless telephone numbers, such as for example, numbers starting with three digit area code followed by the seven digit phone number. Currently, VoIP service providers 35 use the same standard as the NANP (North America Numbering Plan), however, such a numbering plan is not required. For example, VoIP service provider 35 may offer the ability to select a number from an area code of their choice as well as the ability to take their assigned number with them when they move. After the numbers are assigned, each service provider correlates the assigned phone number to the MAC address of the portable VoIP phone as well as MAC corresponding email address of the phone. It is understood that any manner used by VoIP service provider 35, for assigning VoIP numbers, are all within the contemplation of the present invention.

For this arrangement of portable VoIP phones, the assigned phone number and its MAC corresponding email address are stored in a universal directory 33 referred to as local number portability database 33. For this approach, database 18 may store the unique assigned phone number for each subscriber's VoIP phone. Upon request by a calling party requester 4 to connect to a subscriber device 6, system 2 accesses local number portability database 33 to retrieve the MAC corresponding email address of the subscriber, so as to arrange for a call completion.

As shown in FIG. 1, when a call comes into switch 12, the call is identified by a DNIS which relates to the number dialed by requester 4, so that appropriate data generated by system 2, such as incoming call record 15 (FIG. 2) and call completion data packets 50 (FIG. 3), can be routed to the network elements and then to the correct switch 12 to complete the call, as will be explained in more detail hereinafter.

In accordance with one embodiment of the invention, upon the initiation of a call completion, switch 12 is configured to pass the originating phone number of requester 4 and/or the number dialed by requester 4 to MSC 8 or PSTN 10 or VoIP service provider 35 for delivery to requested device 6. This enables requested device 6 to screen in-bound calls.

Additionally, as shown in FIG. 1, switch 12 maintains an integrated voice response unit for use with certain features such as pre-announcement features or other features requiring a generated voice. For the purposes of this invention, Voice Response Unit (VRU) shall refer to any hardware and software combination that allows for the recording and/or delivery of voice messages. Although only one switch 12 is illustrated in FIG. 1, any number of switches 12 can be used in system 2 to increase the capacity of system 2.

In one embodiment of the present invention, as shown in FIG. 1, another exemplary network element is shown, namely a closing prompt storage module 13, configured to store a variety of closing prompt messages and data. When the switch 12 completes the call from requester 4 to requested device 6, switch 12 can play any one of a variety of closing prompts based on the information received from a call completion data packet 50. Closing prompt storage module 13 is also coupled to WAN 25, so that for VoIP phone call completion, the variety of closing prompts can be sent to subscriber 6 via Internet 31.

As shown in FIG. 1, billing database 14 is another network element used as the repository for the billing data and includes but is not limited to: records which are preferably comprised of the call date, the call start time, the call end time and the resulting time, i.e. the call length, the originating phone number for requester 4, the completion number for requested device 6 and fields which identify the originating and terminating service providers.

Another exemplary network element is primary call center 16 which is generally comprised of hardware and software that accepts inbound calls from switches 12 and distributes the calls to multiple operator terminals 20 using standard Automatic Call Distribution (ACD) technology. Operator terminal 20 interacts with database 18 to search for and retrieve desired numbers or contact information corresponding to requested device 6.

The connection between primary call center 16 and operator terminal 20 is such that voice communication is transmitted directly between the two and data information is transmitted via computer telephony interface 29. This may also be accomplished via in-band signaling, as will be discussed below. Operator terminal 20 is not only connected to database 18 but also to other databases and software application modules as well.

Primary call center 16 can be comprised of one or more processors coupled together in a networked arrangement to accomplish these functions, and can be constructed using known computing technology such as using personal computers, mini or mainframe computing devices, routers, switches and the like. Because the arrangement and operation of primary call centers 16 and 16' are similar, discussion of primary call center 16 is understood to also describe primary call center 16'. It is noted that primary call center 16 tracks all calls that pass though to operator terminals 20 in order to provide records for billing and system 2 diagnostics.

Computer Telephony Interface (CTI) 29 is disposed between call center 16 and operator terminal 20. CTI 29 is configured to route the data portion of an incoming requester 4 call, such as the number dialed by requester 4 and the originating phone number of requester 4 to operator terminal 20, while the voice portion of the call is transmitted directly between call center 16 and operator terminal 20. While not discussed here, it is contemplated within the context of this invention that the data portion of an incoming requester 4 call could be sent to operator terminal 20 using in-band signaling (i.e., with the voice path of the call) as well.

Operator terminal 20 can also be any known computing device capable of receiving and displaying data on its display, including but not limited to a personal computer, UNIX workstation and the like. Although it is preferred that a separate customer service representative telephone be implemented as part of system 2 and coupled to primary call center 16 for communicating with requester 4, operator terminal 20 is not limited to this arrangement.

For example, operator terminal 20 can be arranged to contain an integrated telephone (as shown). In other words, any arrangement that allows a customer service representative to engage in oral communications with requester 4 is sufficient. In addition, although only a single operator terminal 20 is shown, system 2 is not limited to this arrangement. It is contemplated that system 2 is comprised of multiple operator terminals 20 such that more than one customer service representative is available to accommodate the users of system 2. As with primary call center 16, operator terminals 20 preferably track all calls that pass through back to primary call center 16 in order to provide records for billing and system 2 diagnostics.

It should be noted that primary call center 16 and its communication with switches 12, operator terminal 20 and database 18 as well as the arrangement and communication between primary call center 16' and switches 12' can be implemented in accordance with the connectivity and communication techniques described in U.S. Pat. No. 6,404,884, issued on Jun. 11, 2002, the contents of which are incorporated herein by reference. In an alternate embodiment of this invention it is contemplated that a requester 4 may interact with an agent using a non-voice method such as, but not limited to: Short Messaging Service (SMS), Wireless Application Protocol (WAP), Live Chat, and Instant Messaging (IM) as will be discussed below.

Agent application 19 platform is used to operate operator terminals 20 and databases 18. This system not only supports the communications between these modules but also prepares call completion data packet 50 that is to be sent to switch 12 to ultimately complete the call.

To create a call completion data packet 50, operator terminal 20 and agent application 19 require information to be retrieved from database 18. This data is used to populate the various fields of call completion data packet 50 as discussed in more detail below.

Database 18 is preferably any known database system which can be programmed to store all of but not limited to the following: wireline telephone directory listings, mobile phone listings, email addresses, geographic location information, originating service provider 26 of requester 4 listings, originating VoIP service provider 35 of requester 4 listings, WAIN listings, VoIP related listings and other listings such as providers of goods and services.

Database 18 preferably supports multiple database tables for a voluminous quantity of listings and multimedia data associated with each user or organization that is sponsoring a group of users.

It should be noted that the present invention augments the database tables described in U.S. Pat. No. 6,404,884. issued on Jun. 11, 2002, by including several additional fields to support new features as discussed herein.

Database 18 can be based on any known database software and any known database format. The hardware configuration of database 18 can be any hardware platform capable of supporting the quantity of users and entries in their respective database tables. As such, database 18 can be stored on any device capable of storing the information.

Those of ordinary skill in the art can appreciate that although database 18 is shown as a single unit, it is not limited to this configuration. Database 18 can be comprised of multiple hardware units, i.e., central processing units and/or storage devices such as CD-ROMs, hard disk drives, tape disk drives, etc. which can communicate with each other across a transmission link. In addition, while only specific tables and fields within database 18 are discussed in detail, the current invention does not limit the table schema in database 18.

In accordance with one embodiment of the present invention each database in system 2 or system 2' such as database 18 or 18' stores the same information. In an alternate embodiment, it is also contemplated that database 18 can take the form of a distributed database. For example, users who are primarily based on the west coast can be supported from a portion of database such as database 18' located in California, while users primarily located on the east coast can access a portion of database such as database 18 located in New York.

In addition to providing system 2 with listings for requested devices 6, supported by database 18 other services are available through System 2. For example, as illustrated in FIG. 1, a directions unit within enhanced services module 21 provides system 2 with a means to send directions to a requester 4. A directions unit is incorporated in the enhanced services module 21 used by agent application 19 running on operator terminal 20 and allows a customer service representative to retrieve directions and transmit them to requester 4.

The directions feature in enhanced services module 21 may be a stand alone unit that is configured to calculate directions based on a starting and a destination address, or other criteria as currently known in the industry. In accordance with another embodiment of the invention, enhanced services module 21 may be connected via a communications channel, for example, Internet, to a remote directions calculating unit operated by a third party such as those available by MAPQUEST™.

In other examples, it is noted that enhanced services module 21 also supports features such as providing a requester 4 with restaurant recommendations/reservations, advanced movie ticket purchase.

Closing prompt module 27 provides the closing prompt identification data that may be included in a defined field such as a closing prompt code field 58 of call completion data packet 50 as shown in FIG. 3. As mentioned, call completion data packet 50 prompts switch 12 with a command to activate the appropriate closing prompt.

Agent application 19 software then creates a call completion data packet 50. Alternatively, closing prompt module 27 or some other application could create call completion data packet 50: however, for the purposes of this discussion agent application 19 will be forming call completion data packet 50.

Wide Area Network (WAN) 25 is configured to couple all operator terminals 20 to system 2 and 2'. This includes connections between geographic locations, such that operator terminals 20 located at a call center can connect with switches 12 at other remote locations. As noted earlier and to be discussed in more detail below, because primary call center 16 may route calls to remote operator terminals 20' it is necessary that those operator terminals 20' be able to communicate back to the originating switch 12 in order to connect to the proper call. WAN 25 is configured to relay call completion data packet 50 to the appropriate switch 12 in order to complete requester 4's call.

Agent application 19, as supported by one of the operator terminals 20, communicates via operator terminals 20 to any one of the switches 12 with the combination of systems 2, 2' etc. via Wide Area Network 25 (WAN). WAN 25 allows customer service representatives at operator terminals 20 to transmit call completion data packet 50 from operator terminals 20 to any one of switches 12.

In the event that agent application 19 is unable to successfully pass call completion data packet 50 due to any number of reasons including but not limited to the unavailability of WAN 25 or the rejection of call completion data packet 50, agent application 19 can initiate call completion using in-band signaling such a DTMF. This allows agent application 19 to put the requester on soil hold and pass the destination digits to switch 12 via the same trunk. Switch 12 then accepts the digits and releases the call to primary call center 16 and initiates call completion as described hereinafter.

Another exemplary network element in system 2 is call completion table 17. Call completion table 17 allows switch 12 to select an outbound trunk group that can most efficiently route the call to the end destination. For example, if requester 4 requests a traditional directory assistance listing (i.e. a wireline business or residential listing), service provider 26 of requester 4 may prefer to complete these calls on their own network. In this case call completion table 17 would select an outbound trunk group to service provider 26 of requester 4.

In the case where requester 4 requests a wireless requested device 6, it may be more desirable to complete the call via the network of the service provider 26 of requested device 6. In this case call completion table 17 would select a direct outbound trunk group to service provider 26 of requested device 6.

In the case where requester 4 is making a call via VoIP service provider 35, it may be more desirable to complete the call via the network of service provider 35. In this case system 2 transmits the call completion information to service provider 35 so as to handle the call connection between requester 4 and requested device 6.

Call completion table 17 also allows for the programming of multiple outbound routes for each call depending on, but not limited to, the time of day, the service provider 26 of requester 4, the service provider 26 of requested device 6, the service provider 35 of VoIP requester 4, corresponding rates for each service provider and time of the day and the NPA/NXX of the destination.

Regarding signaling and trunking configurations, the communication links between switch 12 and primary call center 16 (or call center 16') and the communication links between switch 12 and Mobile Switching Center (MSC) 8 can be implemented as release link trunks. In this embodiment of the current invention the communication links are released once the call completion data is transmitted to the destination end of the link. Release link trunk technology is known in the art and allows resources at the destination device to be freed by employing a predetermined signaling sequence which is recognized by the destination device as a release link signal. In addition, in another embodiment of the current invention, the communication links between switch 12 and Mobile Switching Center (MSC) 8 can be implemented as Multi-frequency MF signaling. One possible example of MF signaling is Feature Group-D (FG-D) links as commonly known in the industry.

In an alternative embodiment of the current invention, the communication links between switch 12 and Mobile Switching Center (MSC) 8 can be implemented as SS7. SS7 is a type of out-of-band signaling, as is commonly known in the industry. In another embodiment of the invention, the links between switch 12 and MSC 8 can be implemented as DTMF signaling. DTMF is a type of in-band signaling. All of these signaling choices are known in the art and are meant only as possible embodiments of the current invention but should not be seen as limiting the possible choice of communication links by which the current invention can be implemented.

As part of the call completion process, switch 12 has the ability to select the optimal trunk group to be used for the completion of requester 4 to requested device 6. For example, if switch 12 has a direct connection to the service provider 26 of requested device 6, the completion of this call would be implemented over this link.

In the case where switch 12 did not have a direct connection to the service provider 26 of requested device 6, the completion of this call would be via the PSTN 10. This allows switch 12 to select the most cost effective means of delivering the call to requested device 6. This selection of the outbound trunk group may be determined by call completion table 17 (as shown in FIG. 1) based on information contained in call completion data packet 50. For example, the NPA.nxx of the number in the requested device information field 56 in call completion data packet 50 can be used to indicate the service provider 26 for that listing. This information is then used to determine whether a direct connection exists from switch 12 to that service provider 26. If such a direct connection exists, then the first choice route for this call would be via that link. In the event that such direct connection is not available or does not exist, an alternate route such as a connection to the PSTN 10 could be used.

The above described materials illustrate one exemplary description of the various network elements that combine to form a directory assistance system and network 2. However, this example is in no way intended to limit the scope of the present invention. Any similar directory assistance system and network 2 that employs similar network elements in a manner to provide directory assistance services is within the contemplation of the present invention.

It is noted that each of the above described network elements may each run on one or more different protocols. In fact, in many cases, certain network elements such as switches 12, primary call centers 16 and operator terminals 20, each of which are primary network elements in the call handling process, may operate on different protocols. To this end, system 2 maintains a Universal Call Identifier (UCI) for each call being handled, whereby the UCI propagates through each network element in system 2 that is handling a service request. As such each network element creates a record referred to as a Call Record Data (CRD) associated with the same UCI data assigned to each call.

In one embodiment of the present invention, regarding the communication of call information between network elements in system 2, as illustrated in FIG. 2, an incoming call information record 15 is generated by switch 12, after switch 12 receives a call from requester 4.

As illustrated in FIG. 2, incoming call information record 15 contains a number of fields that may include but are not limited to: number dialed by requester field 100, preferred language code field 102, originating phone number of requester field 104 (referring to the ANI (Automatic Number Identification), requester service provider field 106, feature code field 108, and a Universal Call Identifier (UCI) field 110.

The number dialed by requester field 100 contains the number dialed by requester 4 and may be used to identify the originating switch location of the incoming call. Preferred language code field may be populated by switch 12 based on the information from Field 100 or it may be based on an active selection response by requester 4.

For example, system 2, and in particular switch 12, maintains the ability to translate many different dial strings into system 2. One possibility for determining the preferred language of requester 4 is to automatically route calls from a particular dialed number, for example NPA-555-1818, directly to, for example, Spanish speaking operators. The preferred language code field 102 is used to route calls to primary call center 16 via switch 12 by way of incoming call information record 15. Originating phone number of requester field 104 (ANI) is used to assist in performing call connection at the end of the call and is also used to track the call for billing records.

Requester service provider field 106 is used to indicate the service provider of requester 4 and is also used to assist in call completion and billing recordation. Service provider field 106 also allows system 2 to identify the calling party's service provider 26 for use with various functions such as introduction prompts, closing prompts, billing information, usage tracking, etc. One example of a use of this data is to allow for the settlement of billing charges between the service provider 26 of requester 4 and service provider 26 of requested device 6.

Feature code field 108 is used to indicate if any additional system 2 features should be applied to the call. These features could include, but are not limited to: promotional rate plans, standard rate plans, bundled service plans, device capabilities and the like. For example, service provider 26 may offer unlimited directory assistance for a flat fee per month, or could offer services free for a promotional period.

Finally, universal call identifier field 110 is used to apply a universal call identifier code to the call, and to transmit that information from network element to network element within system 2. This universal call identifier, stored in field 110, is associated with the incoming call record 15 and is used to track the call throughout system 2. Once this universal call identifier is set by system 2 it remains the same throughout the entire call pathway through system 2 regardless of the protocols operating on the various network components that the call passes, as will be explained in greater detail below. As noted above, universal call identifier field 110 is filled with a universal call identifier that is either generated by a device outside of system 2, generated by switch 12 or generated by some other network element within system 2, For calls initiated by a requester 4 employing a VoIP phone, VoIP service provider 35 generates a Session Initiation Protocol (SIP) message addressed to system 2's IP address. The SIP message contains the originating switch IP, which is the IP address of VoIP service provider 35. This information can be used to populate field 106 of incoming call information record 15.

The SIP message also includes the originating IP of requester 4's VoIP phone. This IP may include the MAC corresponding email address of the VoIP phone as described earlier in connection with description of VoIP operation. In accordance with another embodiment of the invention, this IP instead of being a MAC corresponding email address may be an assigned phone number.

In the event that the incoming originating IP is an assigned phone number, system 2 accesses Local Number Portability database 33 to retrieve the MAC corresponding email address for the particular assigned phone number.

The originating IP of a requester phone is then used to populate originating phone number requester field 104 of incoming call information record 15.

The SIP message received from service provider 35 also includes the number dialed by requester 4 so as to populate Number Dialed By Requester field 100 of incoming call information record 15.

Once incoming call information record 15 is generated by switch 12, the call is forwarded to primary call center 16 for distribution to the appropriate operator terminal 20 to handle the call. Each of the various network elements operates with one another according to the above detailed description. Once the requested device 6 information is obtained by operator terminal 20 via database 18 or another source within system 2, call completion data packet 50 is assembled. As noted above, throughout this entire call pathway through system 2, the universal call identifier assigned by switch 12 and placed in universal call identifier field 110 is the same, regardless of the operating protocols of the network elements on which the call passes.

It is noted that in accordance with one embodiment of the invention, both system 2 and VoIP service provider 35 include Session Border Controllers, such as 55, to provide added network security as appreciated by those skilled in the art. Session Border Controllers provide some level of Network Address Translation (NAT) on each SIP message to cloak the inter-working of their corresponding network.

For example, Session Border Controller 55 of system 2 screens the incoming SIP message generated by system provider 35, when a requester 4 intends to make a directory assistance call to system 2, in order to validate the request from an authorized service provider 35, it is only after such validations are complete that system 2 sets up a Real-Time Protocol (RTP) as an actual voice path between requester 4 and system 2.

It is noted that in accordance with another embodiment of the invention, each VoIP phone that employs a directory assistance call to system 2 can be configured to use a designated port, regardless of the service provider that handles the VoIP phone communication. A dedicated port for directory assistance communications allows the VoIP device access system 2 by using a soft key on the device to initiate a request session. Furthermore, with a dedicated port, the VoIP device can handle Internet security issues more easily, since the only port that needs to communicate is the port dedicated for the directory assistance calls.

Once incoming call information record 15 is generated by system 2, the call is forwarded to primary call center 16 for distribution to the appropriate operator terminal 20 to handle the call. Each of the various network elements operates with one another according to the above detailed description. Once the requested device 6 information is obtained by operator terminal 20 via database 18 or another source within system 2, call completion data packet 50 is assembled.

In one embodiment of the present invention, as illustrated in FIG. 3, call completion data packet 50, comprise multiple data fields, and is configured to provide additional call pathway information between network elements within system 2.

These fields can include but are not limited to the originating phone number of the requester field 54 (requester 4 ANI), the requested device information field 56, closing prompt code field 58, and pre-announcement field 59 and call completion universal call identifier field 60.

Call completion data packet 50 is formed by agent application 19 at operator terminal 20 using information from incoming call information record 15, database 18, and closing prompt module 27. This information is then organized and used to populate the fields of call completion data packet 50. This call completion data packet 50 assists network elements, within system 2, to ensure call completion to requested device 6.

The originating phone number field 54 is the originating phone number of requester 4. The requested device information field 56 is the requested listing of the subscriber. This information may be provided to operator terminal 20 by the retrieved listing from database 18. The requested device information field 56 identifies the proper destination for the completed call. This information is used to properly connect requester 4 to requested device 6.

Call completion universal call identifier field 60 is reserved for storing the universal call identifier associated with the call, taken from universal call identifier field 110 of incoming call information record 15. Again this field is used to store the same universal call identifier, assigned to the call by switch 12 in order to track it throughout the call completion process in system 2. This ensures that not only the network elements used in responding to requester 4 are provided access to the universal call identifier information, but also the network elements utilized during call completion are provided with the same universal call identifier. In some cases these network elements may be the same, such as is the case for switch 12.

Closing prompt code field 58 of call completion data packet 50 contains instructions on which closing prompt to retrieve, use and play for requester 4. Pre-announcement field 59 of call completion data packet 50 denotes to the Voice Response Unit (VRU) whether or not the pre-announcement feature is activated. If the pre-announcement feature is activated the VRU will announce requester 4's identity to requested device 6 by either voice or text message so that requested device 6 can determine whether or not to accept the call.

When combined, the originating phone number of requester field 54, the requested device information field 56, the closing prompt code field 58, and pre-announcement field 59 and universal call identifier field 60 contain all of the information needed to initiate and complete the call, and play the appropriate closing and pre-announcements.

In view of the above described network elements for directory assistance system network 2, incoming call record 15 and call completion data packet 50, it is shown the basic elements for receiving a call from requester 4, providing directory assistance to that requester 4 and connecting them in many instances to requested device 6.

In accordance with one embodiment of the invention, since each network element within system 2 employs the same Universal Call Identifier (UCI), the process for call completion by system 2 may include an arrangement for providing the device 6 information, such as name and address and other requested information via a multi-media format. Based on the UCI information in the call completion packet, system 2 can retrieve the pertinent information from any one of the network elements in system 2 and provide that information to requester 4 via voice, text messaging and entailing or other Internet protocols as specified by requester 4.

In accordance with another embodiment of the invention, instead of using the Universal Call Identifier (UCI), system 2 employs the IP address of the VoIP device used by requester 4 to track the request session for directory assistance and retrieve the pertinent information from any one of the network elements in system 2 and provide that information to requester 4 via voice, text messaging and emailing or other Internet protocols as specified by requester 4.

It is noted that system 2 may encounter a VoIP phone handling in a variety of scenarios. For example, requester 4 may be employing a VoIP phone to access the information relating to device 6, which could also be a VoIP phone or another Internet connected device. In another arrangement, requester 4 may be employing a VoIP phone to access information relating to device 6, which is a land-line or a cellular phone. Conversely, requester 4 may be employing a land-line or a cellular phone to access the information relating to a VoIP device.

In accordance with one embodiment of the invention, in each of the scenarios described above, system 2, retrieves the requested information, and sends the information along with additional call completion data back to the service provider that originated the requesting call so as to complete the call for requester 4.

As mentioned above, the retrieved information may be one or a combination of: a MAC address; or a MAC corresponding email address; or an IP address; or an assigned phone number of a unique VoIP device. In the event that the retrieved information of device 6 is an assigned phone number, system 2 in accordance with one embodiment of the invention may access LNP database 33 to obtain the corresponding IP address of device 6. System 2 may access LNP database 33 also to determine whether the assigned phone number corresponds to an IP address or a PSTN number. This information is then sent back to service provider 35, enabling the service provider to complete a call either via the Internet or via a PSTN connection, depending on the type of the number retrieved by directory assistance system 2.

In accordance with another embodiment of the invention, switch 12 is configured to handle all types of calls, including land-line, mobile and Internet communication. In that event, system 2 handles the entire call completion by itself, establishing a connection between requester 4 and requested device 6. In the case of Internet related communication, switch 12 functions as a remote controller to establish a packet switched connection between requester 4 and requested device 6.

Figure 4:
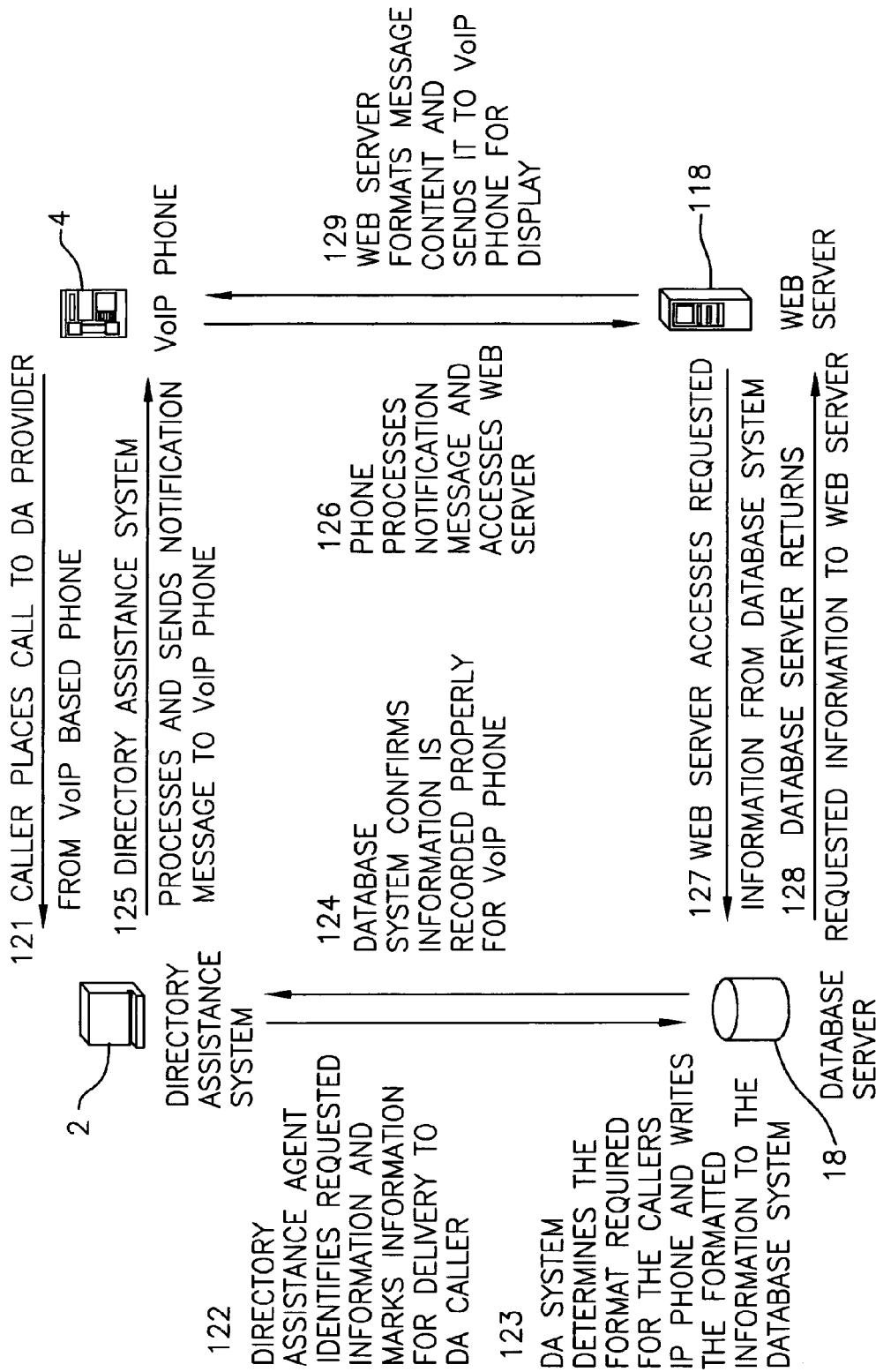
FIG. 4 illustrates a signal flow diagram for a directory assistance call response to a VoIP device in accordance with one embodiment of the invention.

FIG. 4 illustrates signal flow diagrams for accessing directory assistance system 2 by a VoIP device employed by requester 4 based on a plurality of access arrangements as will be described in more detail below.

Thus, at step 121 requester 4 places a call to directory assistance system 2 from a VoIP device, such as a VoIP phone as discussed above in reference with FIGS. 1-3. At step 122, directory assistance system 2 retrieves the requested information and marks the information for delivery to requester 4.

In accordance with one embodiment of the invention, directory assistance system is configured to use the Universal Call Identifier (UCI) information associated with the request made by requester 4 to mark the information retrieved by system 2 in response to the request. To this end, database 18 utilizes the UCI information to create a record that keeps track of the information retrieved and the associated UCI. In accordance with another embodiment or the invention, the call request made by requester 4 is tracked based on the requester's IP address or other information associated with the IP address, similar to the tracking described above in reference with the universal call identification (UCI) information.

At step 123, directory assistance system 2 determines the mode for completing the request. For instance, in accordance with one embodiment of the invention, requester 4's call may be completed by establishing a communication link, with the requested device 6 as explained above. In accordance with another embodiment of the invention, requester 4 may desire to receive the information to its VoIP device directory in accordance with a plurality of multi-media formats. To this end, system 2 employs the UCI data related to the requester 4's request to query database 18 and its data associated with the same UCI.

At step 123, directory system 2 further determines the format required for the requester's VoIP device, and creates a temporary file in database 18 that contains the formatted information.

At step 124, database 18 sends a confirmation signal, advantageously including the UCI data, confirming that the information is recorded properly for the VoIP device.

At step 125, directory assistance system 2 processes and sends a notification message to VoIP device indicating that the requested information is available for retrieval.

At step 126, VoIP device of requester 4 processes the notification message and accesses a Web Server 118 that is coupled to directory assistance system 2.

At step 127, Server 118 accesses the requested information from database system 18 either directly or via WAN 25 of directory assistance system 2.

At step 128, database server 18 returns the requested information to the Web Server. Thereafter, at step 129, the Web Server formats the message content and sends it to the VoIP device for display.

In accordance with one embodiment of the invention, VoIP device of requester 4 is configured to generate a tone or an audible signal to announce the delivery of the requested content. This sound signal is configurable based on the content that is provided to the user. The audible tones may be sent with the requested information to be executed at the VoIP device.

The tone that is played upon delivery is performed through system 2. Each service is preferably configured to have a specific tone or audible message, in addition to rotation, or random ability, either within a subset of tones/messages or random throughout the entire set for that service. In addition, variability in messages may be tied to previous usage patterns for requester 4, the wholesale supplier for requester 4, or any marketing promotion arrangements wither with the wholesale supplier, or system 2. Upon connection of the call, a database within system 2 may select the tone to be played, the message that is sent, and/or the VoIP phone it is directed to. The tone has the proper message as indicated from the evaluation of the above criteria by system 2.

To this end, a requested directory information may have an associated audio file, such as a WAV file. For example, a commercial enterprise may have its own dedicated multimedia file, so that whenever a request for its information is retrieved the multimedia file is executed at the requester's 4 VoIP device. The VoIP device may also have a plurality of default multimedia files that can be played when information relating to a request is available for use.

Once the requested data is displayed by the VoIP device, requester 4 is then in control of the data and has the ability to delete the message, edit the data and/or save the data to the directory located in the VoIP device. In addition to the requested content, associated or unassociated promotional or rebate material may be delivered to the VoIP device in conjunction with the delivery of the requested information. Furthermore, requester 4 may send a signal to system 2 requesting a call completion to the requested device 6. A call completion record is created to complete the call, based on the UCI information of the call request. The call can then be completed as described above in reference with FIGS. 1 through 3.

Figure 5:
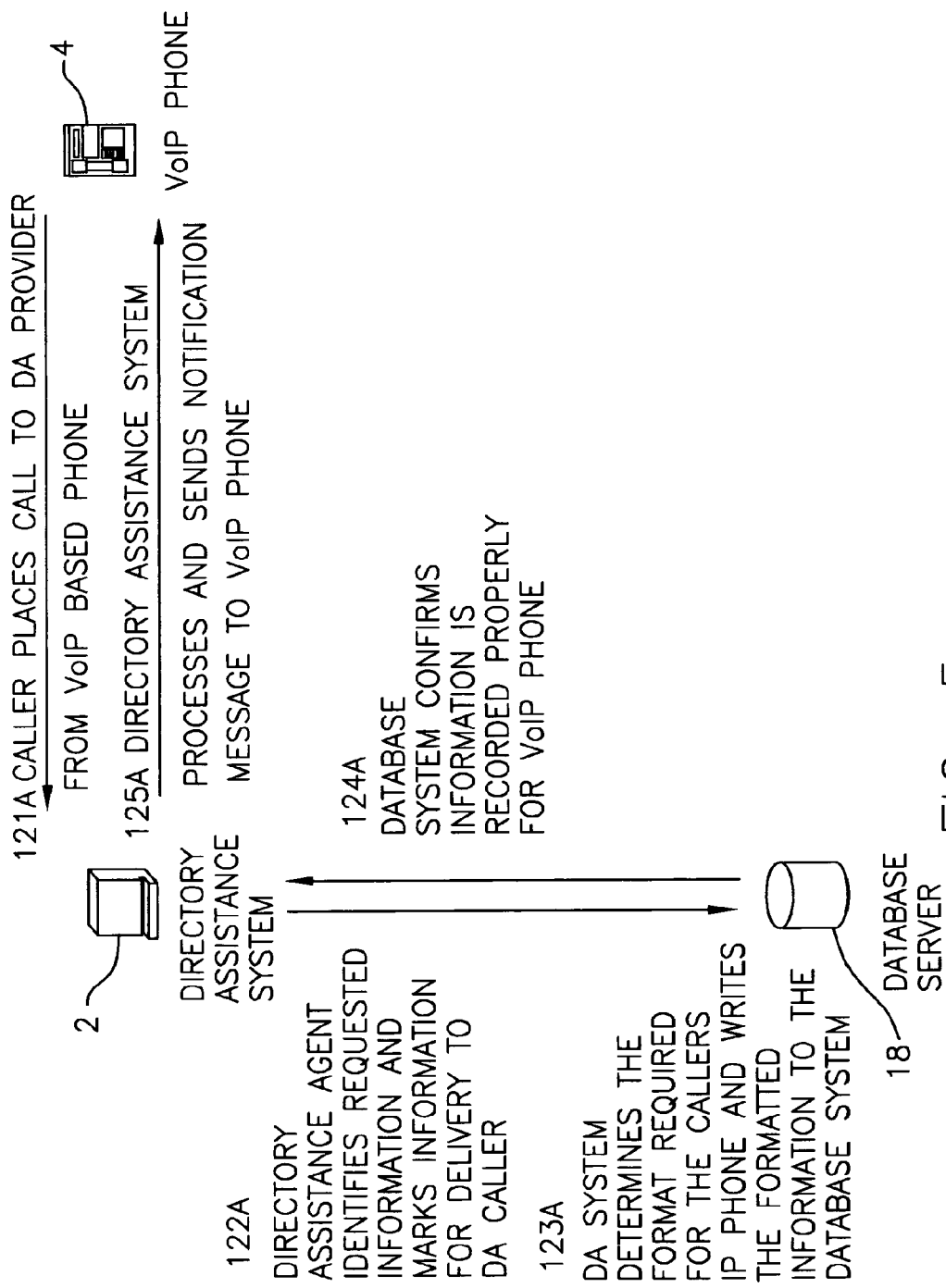
FIG. 5 illustrates another signal flow diagram for a directory assistance call response to a VoIP device in accordance with another embodiment of the invention.

FIG. 5 illustrates the signal flow for a VoIP request service in accordance with another embodiment of the invention. For this embodiment, directory assistance system 2 provides the requested information to the VoIP device of requester 4, rather than arranging for a WebServer delivery of the information as described in reference with FIG. 4.

Thus, as illustrated in FIG. 5, at step 121(*a*), requester 4 places a call to directory assistance system 2 from a VoIP device, such as a VoIP phone. At step 122(*a*), directory assistance system 2 identifies the requested information and marks the information for delivery to requester 4. In accordance with one embodiment of the invention, the requested information is marked based on the universal call identifier data information as explained above in reference with FIG. 4. In the alternative, the information is marked based on the IP address of the VoIP device used by requester 4, or any other information corresponding to the IP address.

At step 123(*a*), directory assistance system 2 determines the format required for the VoIP device employed by requester 4. System 2 then generates the formatted responsive information and stores it in database 18.

At step 124(*a*), database system 18 confirms the information is recorded properly for the VoIP device used by requester 4. Finally, at step 125(*a*), directory assistance system 2 formats the message content and sends it to the VoIP device for display. Requester 4 has the same options to follow in connection with the received message as described previously with reference to FIG. 4.

Figure 6:
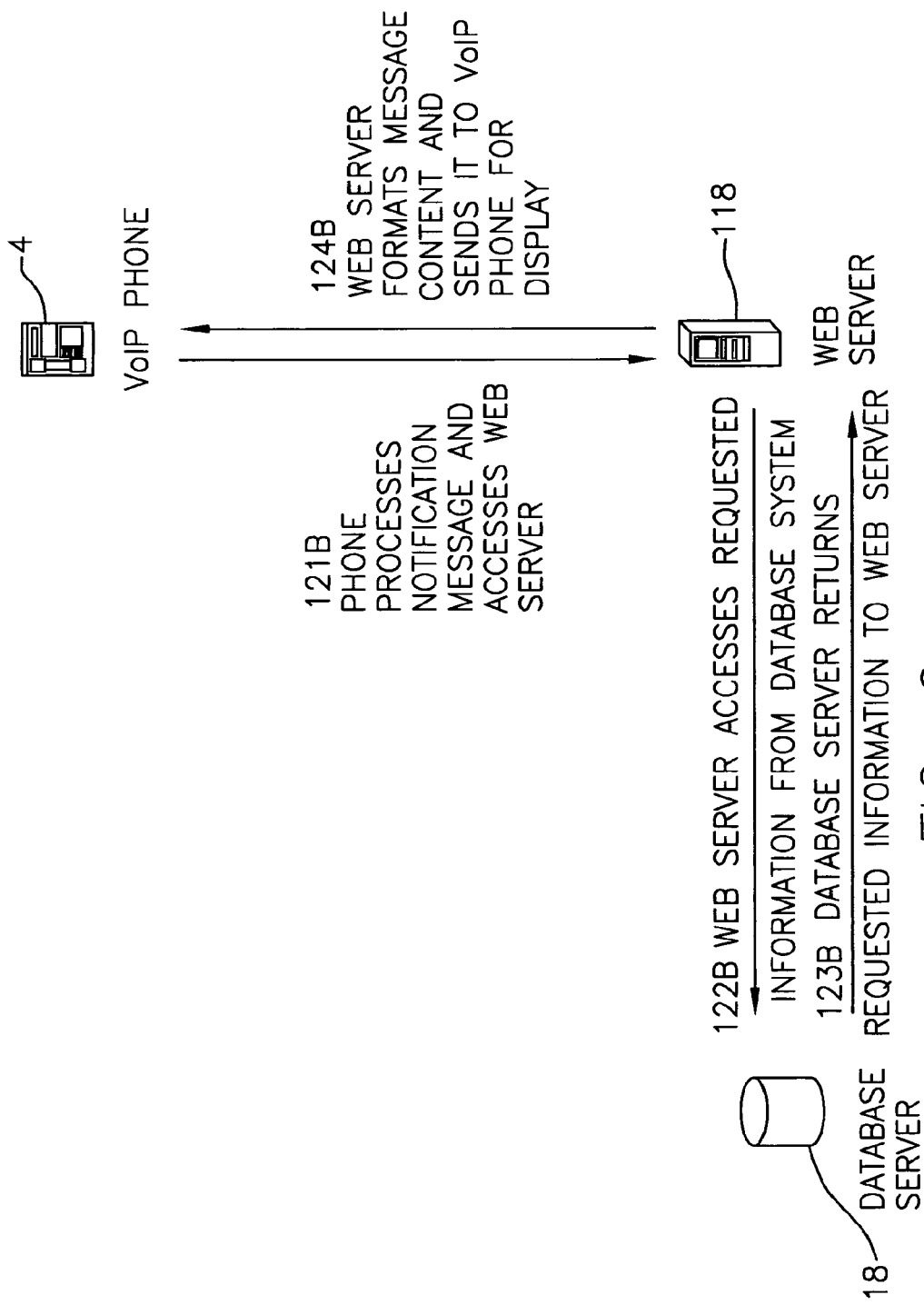
FIG. 6 illustrates another signal flow diagram for a directory assistance call response to a VoIP device in accordance with yet another embodiment of the invention.

FIG. 6 illustrates the signal flow for a VoIP service request in accordance with another embodiment of the invention. In accordance with this embodiment. VoIP device is configured to directly access database 18 of directory assistance system 2.

For this embodiment requester 4 advantageously installs a software application on the VoIP device, enabling the device to communicate directly and access the information stored in database 18. The software application provides the same functionality for retrieving information and generating call completion records as that provided by system 2 and described in reference with FIGS. 1 through 3.

The software application enables the user to search the directory assistance database 18 to retrieve any information that traditionally is accessible to a customer service representative of directory assistance system 2.

To this end, requester 4 has the ability to define the area for which they wish to search using information such as address, phone number, city, county, etc. Furthermore, requester 4 has the ability to freely enter the search criteria on the VoIP device to identify the information desired.

Thus, at step 121(*b*), VoIP device employed by requester 4 processes the input information and sends the search criteria to Web Server 118. Web Server 118 is configured to exchange information with database 18. At step 122(*b*) Web Server 118 accesses the requested information from database system 18. Thereafter, at step 123(*b*), database system 18 returns the requested information to Web Server 118. Finally, at step 124(*b*) Web Server 118 formats the requested information in accordance with the requirements of VoIP device 4 and sends the formatted information to the VoIP device for display.

Once the data is displayed to the VoIP device, the user is then in control of the data and has the ability to delete the message, edit the data and/or save the data to a directory on the VoIP device. Requester 4 can also send a request to system 2 for a call completion to the requested device 6, similar to the arrangements explained in FIGS. 4 and 5.

VoIP device employed by requester 4 is configured to generate a tone or an audible signal to announce the delivery of the content. This sound bite is configurable based on the content that is provided to the user.

Furthermore, in addition to the requested content, associated or unassociated promotional material may be delivered to the VoIP device in conjunction with the data delivery. System 2 determines this content to be provided based on various criteria as discussed above.

Although the format of information exchanged today with VoIP phone devices is generally conducted in an industry standard HTML/XML format, it is understood that newer and yet undeveloped standards can easily be incorporated into system 2 and are within the contemplation of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for operating a directory assistance system comprising the steps of:

receiving and storing a plurality of directory listings, said directory listings being received from a plurality of different service providers, said directory listings include, among other contact listings, contact information for connecting to Voice over IP devices said directory listings stored in a database accessible by said directory assistance system;

receiving a directory assistance request from a requester for one of said directory listings, said requester being connected to said system via a first service provider;

retrieving a response to said requester's request from said accessible database;

generating a request completion record for delivery to said requester responsive to said directory assistance request, said request completion record including information relating to at least one of said Voice over IP devices in a case wherein the requested information relates to a Voice over IP device, said request completion record including information relating to a mobile phone device in a case wherein the requested information relates to a mobile phone device, and said request completion record including information relating to a landline device in a case wherein the requested information relates to a landline device, wherein said request completion record, in each instance, contains information necessary for said first service provider to initiate a communication between said requester and said requested listing and wherein said completion record further includes at least one data related to a promotional item applied to said directory assistance request.

2. The method in accordance with claim 1, wherein said storing step further comprises the step of storing a phone number assigned to at least one of said VoIP devices.

3. The method in accordance with claim 1, wherein said storing step further comprises the step of storing an email address corresponding to Media Access Control (MAC) address of at least one of said VoIP devices.

4. The method in accordance with claim 1 wherein said storing step further comprises the step of storing a media access control (MAC) address of at least one of said VoIP devices.

5. The method in accordance with claim 1 wherein said storing step further comprises the step of storing an IP address corresponding to at least one of said VoIP devices.

6. The method in accordance with claim 2 further comprising the step of accessing a local number portability database to retrieve additional address information relating to each one of said assigned phone numbers.

7. The method in accordance with claim 1 further comprising the steps of receiving a service request to said directory assistance system from said requester employing a VoIP device;
   generating an incoming request information record containing an identifier used by said requester to access said directory assistance system, originating address relating to said VoIP device and information identifying a service provider through which said VoIP device is provided access.

8. The method in accordance with claim 7 further comprising the steps of:
   generating a request completion record containing information responsive to said service request; and
   sending said responsive information to said identified service provider servicing the VoIP device that transmitted said request for services, so that said service provider sets up a communication session between said requesting VoIP device and a requested device.

9. The method in accordance with claim 7 further comprising the steps of:
   generating a call completion record containing information responsive to said service request; and
   setting up a communication session between said requester and requested devices in accordance with information provided in said call completion record.

10. The method in accordance with claim 7 further comprising the step of assigning a specified port in each of said VoIP devices for handling communications with said directory assistance system.

11. The method in accordance with claim 1, wherein said promotional item is selected from either one of promotional rate plans and free directory assistance service for a promotional period.

12. The method in accordance with claim 1, wherein said promotional item is either one of associated to or not associated to said directory listing provided in response to said directory assistance request.

13. The method in accordance with claim 1, wherein said promotional item is provided in the form of a tone or audible message played upon delivery request completion record.

14. The method in accordance with claim 1, wherein said maintains a plurality of promotional items in the form of a tone, wherein said system provides one promotional item among said plurality of items either randomly or in a rotation.

\* \* \* \* \*